United States Patent
Hartshorn et al.

(10) Patent No.: US 12,299,181 B1
(45) Date of Patent: May 13, 2025

(54) SYSTEM AND METHOD FOR AUTHENTICITY SERVICE

(71) Applicant: United Services Automobile Association (USAA), San Antonio, TX (US)

(72) Inventors: Joel S. Hartshorn, Port Orchard, WA (US); Mark Paxman Warnick, San Antonio, TX (US); Elena Marie Carrasco, Converse, TX (US); Ravi Durairaj, San Antonio, TX (US); Donald Nathaniel Holloway, III, San Antonio, TX (US); Nolan Serrao, Plano, TX (US); Christian A. Williams, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 103 days.

(21) Appl. No.: 17/953,521

(22) Filed: Sep. 27, 2022

Related U.S. Application Data (60) Provisional application No. 63/249,853, filed on Sep. 29, 2021.

(51) Int. Cl.
   *H04L 9/32* (2006.01)
   *G06F 21/64* (2013.01)
   *H04L 9/00* (2022.01)

(52) U.S. Cl.
   CPC .......... *G06F 21/645* (2013.01); *H04L 9/3213* (2013.01); *H04L 2209/60* (2013.01)

(58) Field of Classification Search
   CPC .............. H04L 9/0819; H04L 63/1433; H04L 63/1425; H04L 63/1416; H04L 63/08; H04L 9/0822; H04L 63/062; H04L 9/3066; H04L 2463/144; H04L 2463/082; G06F 21/32; G06F 21/85
   See application file for complete search history.

(56) References Cited

U.S. PATENT DOCUMENTS

| | | | |
|---|---|---|---|
| 2018/0285840 A1* | 10/2018 | Hasan | H04L 9/08 |
| 2019/0080344 A1* | 3/2019 | Faris | G06Q 30/0207 |
| 2019/0228490 A1* | 7/2019 | Prieto Marquez | G06Q 10/10 |
| 2020/0273048 A1* | 8/2020 | Andon | G06Q 10/02 |
| 2021/0374861 A1* | 12/2021 | McClelland | G06Q 20/40145 |
| 2021/0390190 A1* | 12/2021 | Walker | G06F 21/566 |
| 2022/0207202 A1* | 6/2022 | Beyhaghi | G06F 30/13 |
| 2023/0045071 A1* | 2/2023 | Kalaldeh | G06Q 30/018 |
| 2023/0048225 A1* | 2/2023 | Livesay | G06Q 20/3674 |

(Continued)

*Primary Examiner* — Mohammad A Siddiqi
(74) *Attorney, Agent, or Firm* — Fletcher Yoder, P.C.

(57) ABSTRACT

A system for determining an authenticity of an asset includes one or more hardware processors. The system also includes a non-transitory memory, the non-transitory memory storing instructions that, when executed by the one or hardware processors, causes the one or more hardware processors to perform actions. The actions include receiving an asset, wherein the asset includes a digital asset or a digital representation of a physical asset. The actions also include receiving an input related to the asset to assist in determining the authenticity of the asset. The actions further include utilizing an augmented intelligence module to analyze the asset and to determine the authenticity of the asset based on the analysis of the asset and the received input.

15 Claims, 4 Drawing Sheets

(56) References Cited

U.S. PATENT DOCUMENTS

| | | | |
|---|---|---|---|
| 2023/0230054 A1* | 7/2023 | Livesay | G06Q 20/02 705/39 |
| 2023/0385812 A1* | 11/2023 | Chae | G06Q 20/381 |

* cited by examiner

SYSTEM AND METHOD FOR AUTHENTICITY SERVICE

CROSS-REFERENCE TO RELATED APPLICATION

This application claims priority to and the benefit of U.S. Provisional Application No. 63/249,853, entitled "SYSTEM AND METHOD FOR AUTHENTICITY SERVICE", filed Sep. 29, 2021, which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Authenticity services typically are performed in person and may take time and effort. In the digital age, people and businesses are increasingly performing more transactions online and expect quicker service. In addition, a tremendous amount of data is available online (e.g., through the Internet of Things (IoT), cloud storage, and big data) that is under-utilized or not effectively utilized. At the same time, an increase in tokenization and generation of non-fungible tokens (NFT) provide additional assets of potential value that may be subject to authenticity services. Therefore there is a need for authenticity services that can take advantage of all of the potential data and provide analysis in an efficient manner online.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system for determining an authenticity of an asset is provided. The system includes one or more hardware processors. The system also includes a non-transitory memory, the non-transitory memory storing instructions that, when executed by the one or hardware processors, causes the one or more hardware processors to perform actions. The actions include receiving an asset, wherein the asset includes a digital asset or a digital representation of a physical asset. The actions also include receiving an input related to the asset to assist in determining the authenticity of the asset. The actions further include utilizing an augmented intelligence module to analyze the asset and to determine the authenticity of the asset based on the analysis of the asset and the received input.

In certain embodiments, a non-transitory computer-readable medium includes processor-executable code that when executed by a processor, causes the processor to perform actions. The actions include receiving an asset, wherein the asset includes a digital asset or a digital representation of a physical asset. The actions also include receiving an input related to the asset to assist in determining the authenticity of the asset. The actions further include utilizing an augmented intelligence module to analyze the asset and to determine the authenticity of the asset based on the analysis of the asset and the received input.

In certain embodiments, a computer-implemented method for determining an authenticity of an asset is provided. The method includes receiving, at a processor, an asset, wherein the asset includes a digital asset or a digital representation of a physical asset. The actions also include receiving, at a processor, an input related to the asset to assist in determining the authenticity of the asset. The actions further include utilizing, via the processor, an augmented intelligence module to analyze the asset and to determine the authenticity of the asset based on the analysis of the asset and the received input.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination.

The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

The present disclosure relates generally to systems and methods for authenticity service.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present embodiments provide systems and methods for providing an authenticity service by utilizing augmented intelligence and machine learning in determining an authenticity of an asset. For example, these embodiments enable the authenticity for an asset (e.g., non-fungible asset such as a non-fungible token (NFT) representing a tangible or non-tangible item or a fungible asset) to be determined as a service and an analysis of the authenticity to be provided. Various inputs (e.g., providing additional information that may assist in determining authenticity) may be provided to an authenticity system along with the asset (if in digital form) or a representation of the asset (e.g., digital representation of a physical item). The authenticity system may utilize augmented intelligence to analyze the asset and the provided inputs to further help the authenticity system search for additional information related to the authenticity of the asset and to determine the authenticity of the item. The authenticity system may then provide an assessment of the authenticity of the asset and/or a score indicating a level of confidence in the authenticity assessment of the asset.

Figure 1:
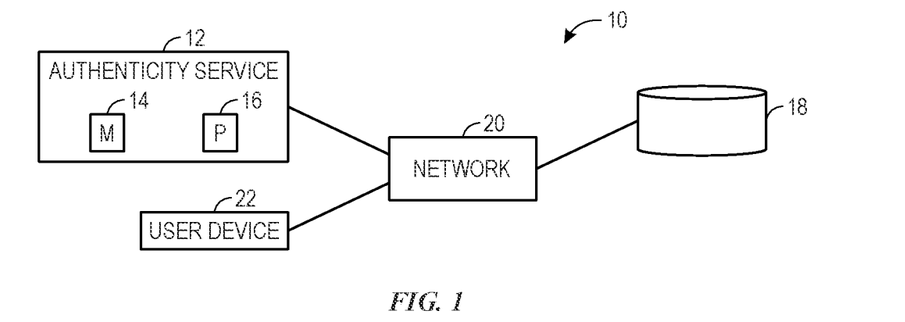
FIG. 1 is a schematic diagram of an embodiment of a system for determining an authenticity of an asset (e.g., online), in accordance with aspects of the present disclosure.

With this in mind, FIG. 1 is a schematic diagram of an embodiment of a system 10 for determining an authenticity of an asset (e.g., online). The asset may be a fungible item or non-fungible asset. The asset may be tangible or non-tangible. As utilized in the system 10, the asset is a digital asset or a digital representation of a physical asset. In certain embodiments, the asset may be an NFT in a variety of digital forms (e.g., art, music, video, etc.).

The system 10 may include an authenticity service system 12 (e.g., a physical computing system and/or a cloud-computing system) configured to receive inputs (e.g., user inputs, professional appraiser inputs, etc.) related to an asset to assist in determining an authenticity of the asset. The inputs may be authenticity evidence itself (e.g., origin data, watermarks, key information, etc.). The authenticity service system 12 may utilize augmented intelligence (e.g., augmented intelligence module or engine) to search for authenticity evidence based on the received inputs. The authenticity service system 12 (e.g., the augmented intelligence module) may also analyze the asset for a variety of purposes. For example, the asset may be analyzed for the type of asset (e.g., physical piece of art, digital art, video, original digital document, etc.) to assist in determining specific features of the asset to analyze for authenticity evidence or to determine specific external sources (e.g., title company, social media platform, etc.) to access to find authenticity evidence. The type of asset may also be utilized for the selection of a specific augmented intelligence model (which is specific to the type of asset). In another example, the asset may be analyzed for the presence of sources of authenticity evidence (e.g., watermark, origin data, etc.). The asset may also include a computer chip, a quick response code, or other source that stores or provides access to a variety of authenticity evidence (e.g., hardware that created asset, chain of custody of asset, date of creation of asset, location data, etc.). The authenticity service system 12 may also provide an indication of the authenticity of the asset to a user. The indication of authenticity may be a declaration that an asset is authentic, likely authentic, likely not authentic, not authentic, or some other statement. The indication of authenticity may also include a score indicating a likelihood of authenticity. In the case of an NFT, the authenticity service system 12 may determine if the NFT is in alignment with the physical world (i.e., a physical asset). The authenticity service system 12 is configured to quickly provide an authenticity assessment for an asset solely through an online environment.

To this end, the authenticity service system 12 may include a memory 14 and a processor or processing circuitry 16. The memory 14 may include volatile memory, such as random-access memory (RAM), and/or non-volatile memory, such as read-only memory (ROM), optical drives, hard disc drives, solid-state drives, or any other non-transitory computer-readable medium that includes instructions executable by the processor 16. The processor 16 may include one or more application specific integrated circuits (ASICs), one or more field programmable gate arrays (FPGAs), one or more general purpose processors, or any combination thereof, configured to execute the instructions stored in the memory 14, such as to determine the authenticity of an asset. The memory 14 also stores the augmented intelligence module (and one or more models) for determining the authenticity of the asset.

The authenticity service system 12 may be communicatively coupled to one or more searchable databases or external data sources 18 (e.g., a physical storage and/or a cloud-based storage) via any suitable communication network or networks 20, including a mobile communication network, a Wi-Fi network, local area network (LAN), wide area network (WAN), and/or the Internet. The one or more databases 18 (e.g., financial database, insurance database, social platform databases, location databases, etc.) are configured to store a variety of data. The databases 18 may include authenticity evidence for the asset. For example, the data may include financial information (e.g., previous financial transactions related to the asset, purchase of the asset from an art gallery). The data may include insurance information (e.g., past or current insurance information for the asset) from one or more insurance providers, a third party, or a group associated that provide authenticity evidence. Also, the data may include information from various social media platforms that may provide information related to the asset (including origination of the asset on a particular platform). Even further, location information (e.g., current or past locations of the asset) may be provided in a location database. Any type of database 18 may be searched for authenticity evidence.

The system 10 also includes a user device 22 (e.g., computing device), which may be implemented as or on one or more suitable electronic computing devices, such as a laptop, personal computer, mobile device, smartphone, tablet, wearable device, and so on. The user device 22 may be utilized by a user requesting or performing the authenticity service.

Figure 2:
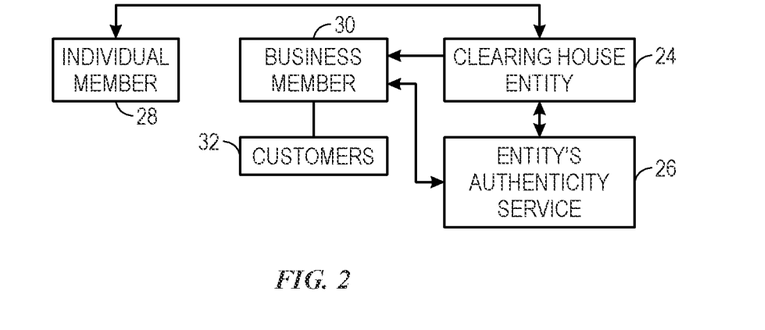
FIG. 2 is a schematic diagram of an embodiment of an arrangement for providing authenticity services, in accordance with aspects of the present disclosure.

FIG. 2 is a schematic diagram of an embodiment of an arrangement for providing authenticity services. As depicted, a clearinghouse entity 24 provides an authenticity service 26 (e.g., utilizing the authenticity service system 12 described in FIG. 1). The clearinghouse entity 24 may be a bank and/or insurance provider. An individual member 28 of the clearinghouse entity 24 may request the authenticity service 26 to be performed on an asset. Alternatively, a business member 30 of the clearinghouse entity 24 may request the authenticity service 26 to be performed on an asset of a customer 32 of the business member 30 or its own asset. In certain embodiments, the clearinghouse entity 24 may provide access to the clearinghouse entity's authenticity service 26 (e.g., in the form of an authenticity service kit) to the business member 30 to enable the member 30 to determine an authenticity of an asset. The authenticity service 26 may be utilized to prove the value of the asset with a higher confidence level for insurance purposes, resale of the asset, or general liquidity uses (e.g., loan/lien). For example, a person going to college may possess one or more NFTS as assets. The person (the customer 32) may approach the business member 30 or the clearinghouse entity 24 (if an individual member) for a student loan and NFTs may be subject to the authenticity service 26 to see if the NFTs could potentially provide collateral for the student loan.

Figure 3:
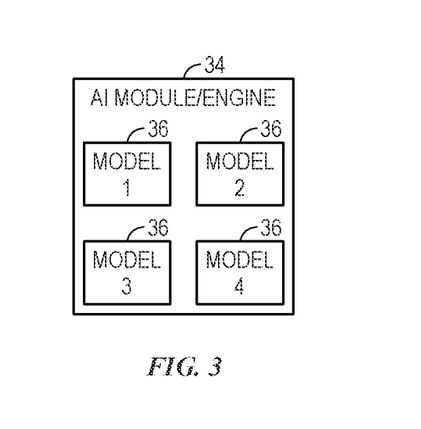
FIG. 3 is a block diagram of embodiment of an augmented intelligence module for determining an authenticity of an asset, in accordance with aspects of the present disclosure.

FIG. 3 illustrates an augmented intelligence (AI) module or engine 34 for determining an authenticity of an asset. The AI module 34 may be part of the computing system described in FIG. 8 or the authenticity service system 12 described in FIG. 1. The AI module 34 may utilize machine learning capabilities coupled with natural language processing and automated insights in determining an authenticity of an asset. As previously mentioned, the AI module 34 may be utilized to search for authenticity evidence based on received inputs. The AI module 34 may also analyze the asset for a variety of purposes. For example, the asset may be analyzed for the type of asset (e.g., physical piece of art, digital art, video, original digital document, etc.) to assist in determining specific features of the asset to analyze for authenticity evidence or to determine specific external sources to access to find authenticity evidence. The type of asset may also be utilized for the selection of a specific augmented intelligence model (which is specific to the type of asset). In another example, the asset may be analyzed for the presence of sources of authenticity evidence. These sources may be computer chips, quick response codes, or other sources that store or provide access to a variety of authenticity evidence (e.g., hardware that created asset, chain of custody of asset, date of creation of asset, location data, etc.). The AI module 34 may also generate an indication of the authenticity of the asset for a user. The indication of authenticity may be a declaration that an asset is authentic, likely authentic, likely not authentic, not authentic, or some other statement. The indication of authenticity may also include a score indicating a likelihood of authenticity.

The AI module 34 may utilize one or more machine learning algorithm models 36. In certain embodiments, a single machine learning algorithm model 36 may be trained for and utilized for determining an authenticity of all kinds of assets. In certain embodiments, the AI module 34 may include multiple machine learning algorithm models 36 each trained for and utilized for determining an authenticity of a different kind or type of asset (e.g., digital art, physical art, video, etc.). The AI module 34 may utilize the inputs received to direct the respective models 36 in their search for authenticity evidence and determining the authenticity of an asset. Each machine learning algorithm model 36 is able to make correlations or derive information from the data sources related to the authenticity of the asset (with assistance from received inputs) that otherwise would not be readily apparent. With each determination of the authenticity of an asset, the models 36 are updated to improve their function (and improve the function of the computing system) in determining the authenticity of assets.

Figure 4:
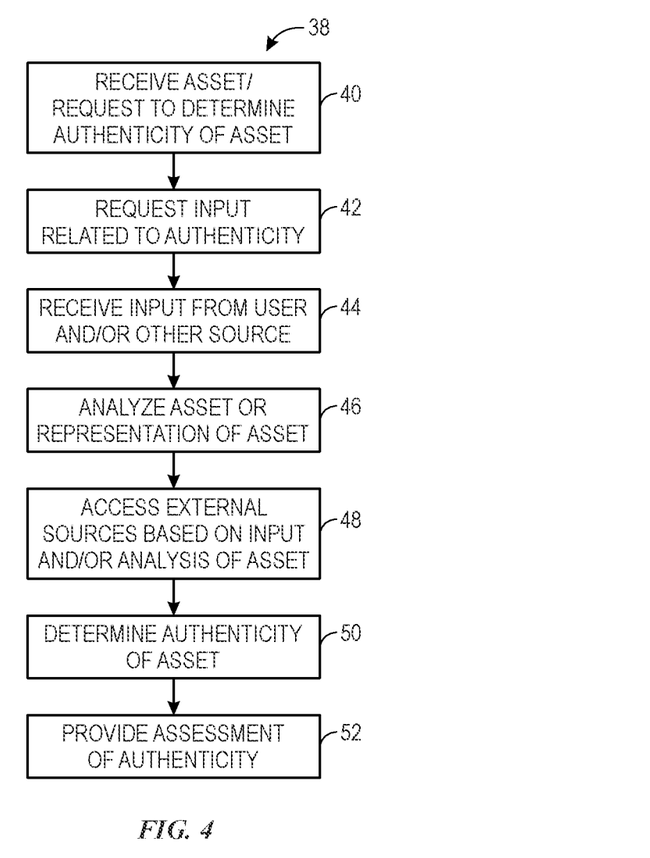
FIG. 4 is a flow diagram of an embodiment of a method for determining an authenticity of an asset, in accordance with aspects of the present disclosure.

FIG. 4 illustrates a flow diagram of a method 38 for determining an authenticity of an asset (e.g., online). One or more steps of the method 38 may be carried out by one or more components of the computing system illustrated in FIG. 8 or the authenticity service system in FIG. 1. One or more steps of the method 38 may be performed simultaneously or in a different order from the order depicted in FIG. 4. The method 38 includes receiving an asset and/or request to determine an authenticity of the asset (block 40). The asset is a digital asset or a digital representation of a physical asset. The asset may be a fungible item or non-fungible asset. The assets may be tangible or non-tangible. In certain embodiments, the asset may be an NFT in a variety of digital forms (e.g., art, music, video, etc.).

The method 38 also includes requesting input related to the authenticity (block 42). The method 38 further includes receiving the input from a user or another source (block 44). The input itself may be authenticity evidence. In other embodiments, the input may provide assistance in searching for authenticity evidence. Examples of input may be where or how the asset was created, the type of asset, past and/or current location of the asset, chain of custody of asset, videos, pictures, title, etc. Other examples of inputs may be keys (e.g., private keys) generated from hardware of devices utilized to generate the media (e.g., camera, computing device, smart phone, social platform, etc.). In certain embodiments, the inputs may be in the form of NFTs. In certain embodiments, the inputs may be professional appraiser inputs that provide authenticity evidence from certified professionals.

The method 38 includes analyzing the asset (block 46). For example, the asset may be analyzed for the type of asset (e.g., physical piece of art, digital art, video, original digital document, etc.) to assist in determining specific features of the asset to analyze for authenticity evidence or to determine specific external sources to access to find authenticity evidence. The type of asset may also be utilized for the selection of a specific augmented intelligence model (which is specific to the type of asset). If the type of asset is known (e.g., a video), it may be analyzed for features related to its authenticity (e.g., code to determine if it was spliced).

In another example, the asset may be analyzed for the presence of sources of authenticity evidence. These sources may be computer chips, quick response codes, or other sources that store or provide access to a variety of metadata that may include authenticity evidence (e.g., hardware that created the asset, chain of custody of the asset, date of creation of the asset, location data, etc.). These sources may put the asset on a block chain to increase the likelihood of the asset being authentic.

The method 38 also includes accessing certain external sources or databases to search for authenticity evidence based on the received inputs and/or analysis of the asset (block 48). For example, a digital picture of a physical piece of art in a particular location may include information related to a location of the physical piece of art (e.g., in a specific house or building) which may lead to looking for authenticity evidence (e.g., inventory of house or building, title of house or building, etc.) related to the physical piece of art in certain sources. In another example, an NFT of a video clip may lead to searching for authenticity evidence (e.g., postings including the video clip) in social media platforms.

The method 38 further includes determining an authenticity of the asset based on the authenticity evidence gathered (block 50). The more authenticity evidence gathered (or provided via the inputs) increases the confidence in the authenticity determination. The method 38 still further includes providing an indication (e.g., to a user) of the authenticity of the asset (block 52). The indication of authenticity may be a declaration that an asset is authentic, likely authentic, likely not authentic, not authentic, or some other statement. The indication of authenticity may also include a score indicating a likelihood of authenticity. For example, for a physical piece of art (provided via a digital picture) to the authenticity service, if no information can be derived from the digital picture or any additional input information provided that leads to more authenticity evidence, then it is less likely to receive an indication that the item is authentic. However, if additional information was provided or authenticity evidence discovered (e.g., location of physical piece of art, name of person in possession of physical piece of art, documentation from professional appraiser, etc.), the physical piece of art is more likely to receive an indication that it is authentic.

Figure 5:
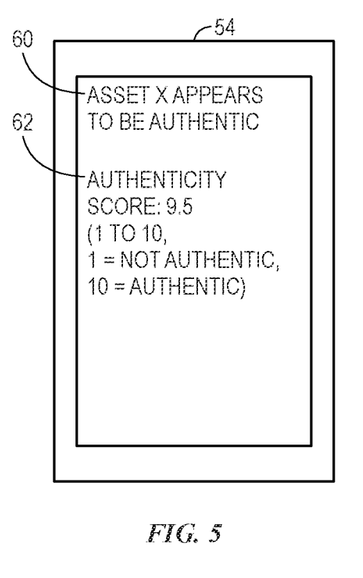
FIG. 5 is an illustration of an embodiment of a graphical user interface or screen for displaying an authenticity assessment, in accordance with aspects of the present disclosure.
Figure 6:
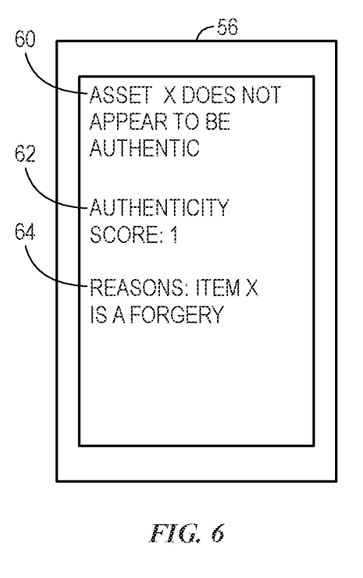
FIG. 6 is an illustration of another embodiment of a graphical user interface or screen for displaying an authenticity assessment, in accordance with aspects of the present disclosure.
Figure 7:
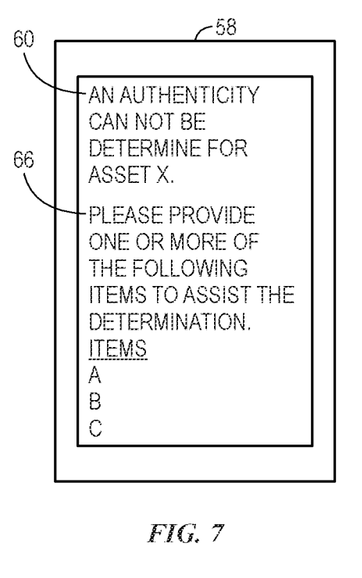
FIG. 7 is an illustration of a further embodiment of a graphical user interface or screen for displaying an authenticity assessment, in accordance with aspects of the present disclosure.

FIGS. 5-7 are illustrations of different examples for displaying an authenticity assessment on a graphical user interface or screen. FIGS. 5-7 illustrate graphical user interfaces 54, 56, and 58, respectively. As shown in graphical user interfaces 54, 56, and 58, a declaration or statement 60 on the assessment of the authenticity of the asset may be provided. The declaration 60 may state an asset appears to be authentic (as shown in FIG. 5), an asset does not appear to be authentic (as shown in FIG. 6), or an authenticity cannot be determined for the asset (as shown in FIG. 7). The declaration 60 may include within it qualifying language indicating a likelihood of the assessment (e.g., a high likelihood of authenticity, a low likelihood of authenticity, an intermediate likelihood of authenticity). As shown in screens 54 and 56, a score 62 indicating a likelihood of authenticity or a confidence level in the authenticity is provided. As depicted, the score 62 may range from 1 to 10 (with 1 being not authentic and 10 being absolutely authentic). In certain embodiments, the range of the score 62 may be different (e.g., 1 to 100). In certain embodiments, the format of the score 62 may be different. For example, the score 62 may be letter based (e.g., with A being absolutely authentic and F being absolutely not authentic). In certain embodiments, a statement 64 (as shown in FIG. 6) may be provided to provide a reason for the declaration 60 and/or the score 62. In certain embodiments, when an authenticity cannot be determined for an asset, a statement 66 (as shown in FIG. 7) may be provided giving the reasons why an assessment cannot be made and items or actions that can be taken to enable an assessment of the authenticity to proceed. The more authenticity evidence provided or discovered will result in a higher likelihood of an asset being deemed authentic. In certain embodiments, the score 62 provided may not relate to a likelihood of authenticity or a confidence level in the authenticity but instead relate to a likelihood of or a confidence in the assessment (e.g., in declaration 60) being correct.

Figure 8:
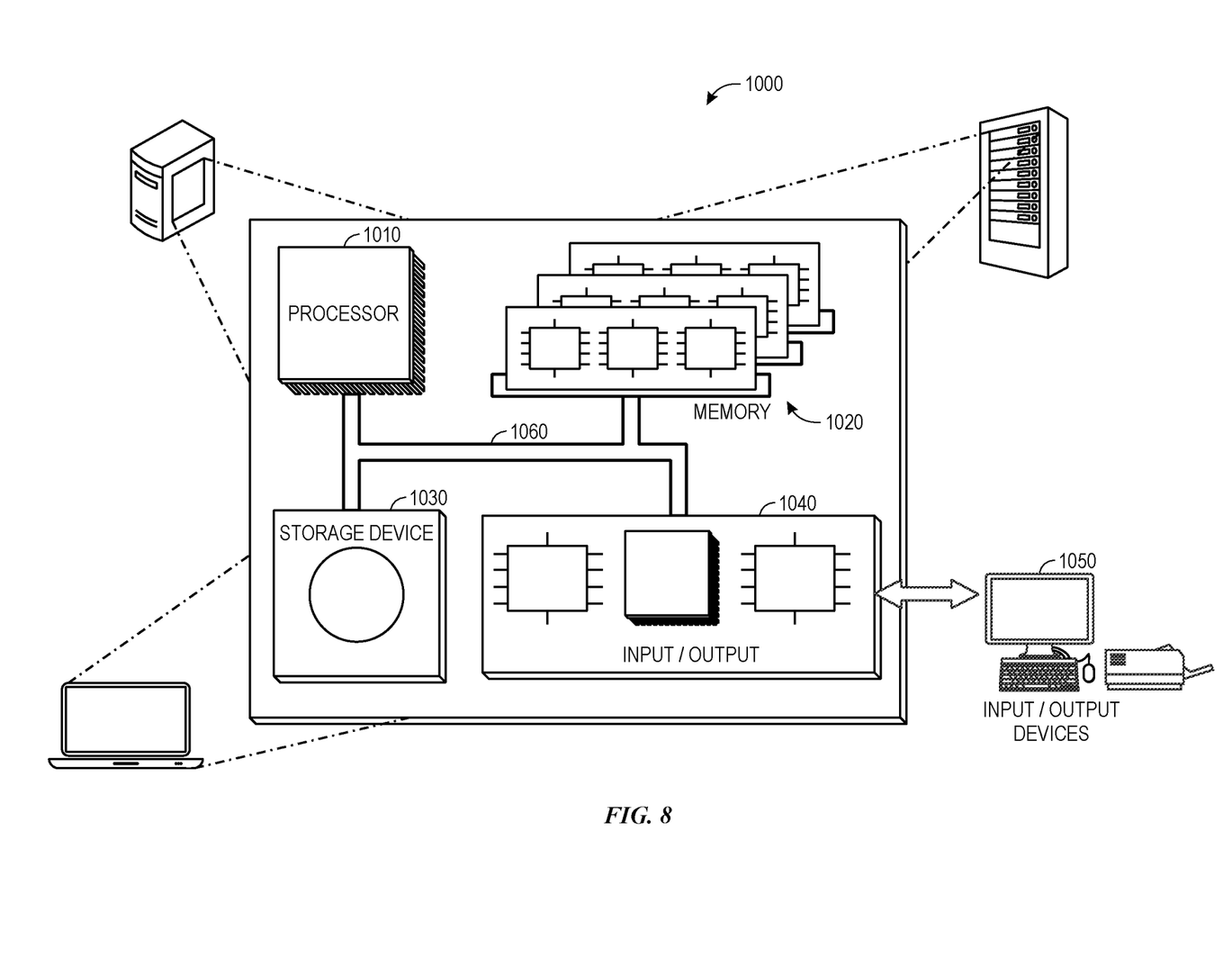
FIG. 8 depicts an example of a computing system, in accordance with aspects of the present disclosure.

FIG. 8 depicts an example computing system, according to implementations of the present disclosure. The system 1000 may be used for any of the operations described with respect to the various implementations discussed herein. For example, the system 1000 may be included, at least in part, in one or more of user device(s) and/or other computing device(s) or system(s) described herein. The system 1000 may include one or more processors 1010, a memory 1020, one or more storage devices 1030, and one or more input/output (I/O) devices 550 controllable via one or more I/O interfaces 1040. The various components 1010, 1020, 1030, 1040, or 1050 may be interconnected via at least one system bus 1060, which may enable the transfer of data between the various modules and components of the system 1000.

The processor(s) 1010 may be configured to process instructions for execution within the system 1000. The processor(s) 1010 may include single-threaded processor(s), multi-threaded processor(s), or both. The processor(s) 1010 may be configured to process instructions stored in the memory 1020 or on the storage device(s) 1030. For example, the processor(s) 1010 may execute instructions for the various software module(s) described herein. The processor(s) 1010 may include hardware-based processor(s) each including one or more cores. The processor(s) 1010 may include general purpose processor(s), special purpose processor(s), or both. The processor may include machine learning circuitry for operating functions of machine learning, including building, training, and/or generating predictions using a machine learning model.

The memory 1020 may store information within the system 1000. In some implementations, the memory 1020 includes one or more computer-readable media. The memory 1020 may include any number of volatile memory units, any number of non-volatile memory units, or both volatile and non-volatile memory units. The memory 1020 may include read-only memory, random access memory, or both. In some examples, the memory 1020 may be employed as active or physical memory by one or more executing software modules.

The storage device(s) 1030 may be configured to provide (e.g., persistent) mass storage for the system 1000. In some implementations, the storage device(s) 1030 may include one or more computer-readable media. For example, the storage device(s) 1030 may include a floppy disk device, a hard disk device, an optical disk device, or a tape device. The storage device(s) 1030 may include read-only memory, random access memory, or both. The storage device(s) 1030 may include one or more of an internal hard drive, an external hard drive, or a removable drive.

One or both of the memory 1020 or the storage device(s) 1030 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1000. In some implementations, the CRSM may include a data store that provides storage of computer-readable instructions or other information in a non-transitory format. The CRSM may be incorporated into the system 1000 or may be external with respect to the system 1000. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1010 and the memory 1020 may be supplemented by, or incorporated into, one or more application-specific integrated circuits (ASICs).

The system 1000 may include one or more I/O devices 1050. The I/O device(s) 1050 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1050 may also include one or more output devices such as a display, LED(s), an audio output device (e.g., a speaker), a printer, a haptic output device, and so forth. The I/O device(s) 1050 may be physically incorporated in one or more computing devices of the system 1000, or may be external with respect to one or more computing devices of the system 1000.

The system 1000 may include one or more I/O interfaces 1040 to enable components or modules of the system 1000 to control, interface with, or otherwise communicate with the I/O device(s) 1050. The I/O interface(s) 1040 may enable information to be transferred in or out of the system 1000, or between components of the system 1000, through serial communication, parallel communication, or other types of communication. For example, the I/O interface(s) 1040 may comply with a version of the RS-232 standard for serial ports, or with a version of the IEEE 1284 standard for parallel ports. As another example, the I/O interface(s) 1040 may be configured to provide a connection over Universal Serial Bus (USB) or Ethernet. In some examples, the I/O interface(s) 1040 may be configured to provide a serial connection that is compliant with a version of the IEEE 1394 standard.

The I/O interface(s) 1040 may also include one or more network interfaces that enable communications between computing devices in the system 1000, or between the system 1000 and other network-connected computing systems. The network interface(s) may include one or more network interface controllers (NICs) or other types of transceiver devices configured to send and receive communications over one or more communication networks using any network protocol.

Computing devices of the system 1000 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1000 may include any number of computing devices 138 of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code), such as one or more programs used to implement the process 400, may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for determining an authenticity of an asset, comprising:
one or more hardware processors; and
a non-transitory memory, the non-transitory memory storing instructions that, when executed by the one or more hardware processors, causes the one or more hardware processors to perform actions comprising:
receiving an asset, wherein the asset comprises a digital asset or a digital representation of a physical asset;
receiving an input related to the asset to assist in determining the authenticity of the asset, wherein the input comprises one or more of where or how the asset was created, a type of the asset, past and/or current location of the asset, chain of custody of the asset, videos, pictures, or title;
utilizing an augmented intelligence module to analyze the asset and to determine the authenticity of the asset based on the analysis of the asset and the received input, wherein the augmented intelligence module is configured to utilize the received input to access external sources and to utilize machine learning coupled with natural language processing in searching the external sources to find authenticity evidence for the asset, and wherein the external sources comprise one or more of a financial database or an insurance database; and
causing an indication of the authenticity of the asset, generated by the augmented intelligence module, to be provided on a graphical user interface on a user's device, wherein the indication of the authenticity comprises a score indicating a likelihood of authenticity based on the authenticity evidence.

2. The system of claim 1, wherein the asset comprises a non-fungible token.

3. The system of claim 1, wherein the input is received from a user of the system.

4. The system of claim 1, wherein the input is received from a professional appraiser.

5. The system of claim 1, wherein the input comprises additional authenticity evidence.

6. The system of claim 1, wherein utilizing the augmented intelligence module to analyze the asset comprises analyzing the asset for authenticity evidence.

7. The system of claim 6, wherein analyzing the asset for authenticity evidence comprises scanning the asset for a computer chip or quick response code that provides authenticity evidence.

8. The system of claim 1, wherein utilizing the augmented intelligence module to analyze the asset comprises determining features to analyze of the asset for additional authenticity evidence and determining specific external sources to access to find the authenticity evidence for the asset.

9. The system of claim 8, wherein the instructions, when executed by the one or hardware processors, causes the one or more hardware processors to select an asset type specific model for the augmented intelligence module to utilize for determining the authenticity of the asset from a plurality of asset type specific models based on the type of asset, wherein each asset type specific model of the plurality of asset type specific models is specific to a different type of asset.

10. A non-transitory computer-readable medium, comprising processor-executable code that when executed by a processor, causes the processor to:
receive an asset, wherein the asset comprises a digital asset or a digital representation of a physical asset;
receive an input related to the asset to assist in determining the authenticity of the asset, wherein the input comprises one or more of where or how the asset was created, a type of the asset, past and/or current location of the asset, chain of custody of the asset, videos, pictures, or title;
utilize an augmented intelligence module to analyze the asset and to determine the authenticity of the asset based on the analysis of the asset and the received input, wherein the augmented intelligence module is configured to utilize the received input to access external sources and to utilize machine learning coupled with natural language processing in searching the external sources to find authenticity evidence for the asset, and wherein the external sources comprise one or more of a financial database or an insurance database; and
cause an indication of the authenticity of the asset, generated by the augmented intelligence module, to be provided on a graphical user interface on a user's device, wherein the indication of the authenticity comprises a score indicating a likelihood of authenticity based on the authenticity evidence.

11. The non-transitory computer-readable medium of claim 10, wherein utilizing the augmented intelligence module to analyze the asset comprises determining features to analyze of the asset for additional authenticity evidence and determining specific external sources to access to find the authenticity evidence for the asset.

12. The non-transitory computer-readable medium of claim 11, wherein the processor-executable code, when executed by the processor, causes the processor to select an asset type specific model for the augmented intelligence module to utilize for determining the authenticity of the asset from a plurality of asset type specific models based on the type of asset, wherein each asset type specific model of the plurality of asset type specific models is specific to a different type of asset.

13. The non-transitory computer-readable medium of claim 10, wherein the input comprises additional authenticity evidence.

14. A computer-implemented method for determining an authenticity of an asset, comprising:
receiving, at a processor, an asset, wherein the asset comprises a digital asset or a digital representation of a physical asset;
receiving, at the processor, an input related to the asset to assist in determining the authenticity of the asset, wherein the input comprises one or more of where or how the asset was created, a type of the asset, past and/or current location of the asset, chain of custody of the asset, videos, pictures, or title;
utilizing, via the processor, an augmented intelligence module to analyze the asset and to determine the authenticity of the asset based on the analysis of the asset and the received input, wherein the augmented intelligence module is configured to utilize the received input to access external sources and to utilize machine learning coupled with natural language processing in searching the external sources to find authenticity evidence for the asset, and wherein the external sources comprise one or more of a financial database or an insurance database; and causing, via the processor, an indication of the authenticity of the asset, generated by the augmented intelligence module, to be provided on a graphical user interface on a user's device, wherein the indication of the authenticity comprises a score indicating a likelihood of authenticity based on the authenticity evidence.

15. The computer-implemented method of claim 14, wherein utilizing the augmented intelligence module to analyze the asset comprises determining features to analyze of the asset for additional authenticity evidence and determining specific external sources to access to find the authenticity evidence for the asset.

* * * * *